(12) United States Patent
Kuzuyama

(10) Patent No.: US 6,983,730 B2
(45) Date of Patent: Jan. 10, 2006

(54) HOMOGENEOUS CHARGE COMPRESSION IGNITION ENGINE AND METHOD FOR OPERATING HOMOGENEOUS CHARGE COMPRESSION IGNITION ENGINE

(75) Inventor: Hiroshi Kuzuyama, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 11/101,334

(22) Filed: Apr. 7, 2005

(65) Prior Publication Data

US 2005/0224045 A1    Oct. 13, 2005

(30) Foreign Application Priority Data

Apr. 8, 2004 (JP) ............................. 2004-114554
May 14, 2004 (JP) ............................. 2004-145220

(51) Int. Cl.
*F02B 3/00* (2006.01)
(52) U.S. Cl. .................................................. 123/294
(58) Field of Classification Search ................ 123/294, 123/434, 435, 445, 480, 568.11, 321
See application file for complete search history.

(56) References Cited

FOREIGN PATENT DOCUMENTS

| JP | 2000-64863 | 2/2000 |
|---|---|---|
| JP | 2000-240513 | 9/2000 |
| JP | 2001-221075 | 8/2001 |

*Primary Examiner*—Bibhu Mohanty
(74) *Attorney, Agent, or Firm*—Morgan & Finnegan, LLP

(57) ABSTRACT

A homogeneous charge compression ignition engine includes a combustion chamber and a piston for compressing and igniting an air-fuel mixture in the combustion chamber. A variable valve actuation mechanism opens and closes an exhaust valve to perform internal exhaust gas recirculation. A heater heats the mixture before the mixture is supplied to the combustion chamber. A storage device stores correspondence information of the amount of internal exhaust gas recirculation and heated state of the mixture heated by the heater that are necessary to perform homogeneous charge compression ignition in relation with the load of the engine and the rotation speed of the output shaft. A controller controls the variable valve actuation mechanism and the heater to achieve the amount of internal exhaust gas recirculation and heated state of the mixture in correspondence with the load and speed required for the engine.

15 Claims, 6 Drawing Sheets

Fig.8(b) Fig.8(c) Fig.8(d)

HOMOGENEOUS CHARGE COMPRESSION IGNITION ENGINE AND METHOD FOR OPERATING HOMOGENEOUS CHARGE COMPRESSION IGNITION ENGINE

BACKGROUND OF THE INVENTION

The present invention relates to a homogeneous charge compression ignition engine and a method for operating a homogeneous charge compression ignition engine. More particularly, the present invention relates to a homogeneous charge compression ignition engine optimal for use as a stationary engine for a private power generator or the like.

Conventional engines may be categorized into two types, a spark ignition (SI) engine and a diesel engine. The thermal efficiency of the SI engine may be increased by causing the air-fuel mixture to be lean. However, there is a limit to the concentration ratio at which a spark may propagate. Thus, an SI engine requires adjustment of the amount of air with a throttle valve. As a result, the thermal efficiency of the SI engine is inferior to that of a diesel engine. Conversely, a diesel engine has satisfactory thermal efficiency. However, the diesel engine does not sufficiently mix fuel and air. As a result, NOx tends to be generated due to local combustion of fuel at high temperatures, and soot tends to be generated due to local enrichment.

In comparison with such engines, a homogeneous charge compression ignition engine premixes air and fuel. Thus, the possibility of local high temperature combustion or enrichment is small, and the generated amount of NOx and soot is subtle. Further, in a homogeneous charge compression engine, chemical changes cause ignition. Thus, the dependency on the concentration ratio is lower than that of an SI engine. As a result, the homogeneous charge compression ignition engine is capable of causing air-fuel mixture to be significantly lean, while achieving thermal efficiency at the same level as a diesel engine. With such advantages, homogeneous charge compression engines are receiving much attention. However, in a homogenous charge compression ignition engine, excessive heat would result in sudden combustion, and insufficient heat would result in misfires. Thus, in comparison to other engines, misfires, knocking, and pre-ignition are apt to occurring more easily. This tends to narrow the operable range of the homogeneous charge compression ignition engine.

A low NOx emission four-cycle engine that reduces the amount of hydrocarbon (HC) emitted together with exhaust gas by taking advantage of homogeneous charge compression ignition has been proposed (refer to, for example, Japanese Laid-Open Patent Publication No. 2000-64863). The engine described in the publication includes a variable valve actuation mechanism that varies the valve timing of an intake valve and an exhaust valve in accordance with whether the load of the engine is low or high. When the engine load is high, the valve timing is set so that the exhaust valve closes when the piston is near the top dead center. When the engine load is low, as the load decreases the valve timing is set so that the exhaust valve closes at an earlier timing before the piston reaches top dead center during the exhaust stroke. Further, when the engine load is in a high state, an igniter, which is arranged in the combustion chamber, ignites and burns fuel when the piston is near the compression top dead center. When the engine load is low, instead of igniting fuel with the igniter, the engine performs homogeneous charge compression ignition. That is, during homogeneous charge compression ignition, the variable valve actuation mechanism adjusts the timing at which the exhaust valve closes to perform internal exhaust gas recirculation (EGR).

A homogeneous charge compression ignition engine that re-circulates some of the exhaust gas and charges the re-circulated exhaust gas into a premixed mixture so that ignition easily occurs has also been proposed (refer to, for example, Japanese Laid-Open Patent Publication No. 2000-240513). The publication proposes the employment of a heat exchanger that heats fuel gas, intake air, or the air-fuel mixture. The heat exchanger heats the premixed mixture so that ignition easily occurs in the engine. Hot water generated by a water heater or the exhaust gas of the engine are given as examples of the heat source for the heat exchanger.

Further, a homogeneous charge compression ignition engine including a supercharger for supplying the combustion chamber with supercharged air (intake air), a cooling means for cooling with a coolant the air supplied and heated by the supercharger, and a supercharging detection means for detecting the supercharging state of the supercharger has been proposed (refer to, for example, Japanese Laid-Open Patent Publication No. 2001-221075). The supercharger is driven by the exhaust gas of the homogeneous charge compression ignition engine. A cooling tower air-cools the coolant. The homogeneous charge compression ignition engine also includes a concentration ratio setting means, which sets the amount of supplied fuel to set the concentration ratio of the premixed mixture, and an air temperature setting means, which sets the temperature of the air supplied to the combustion chamber. The engine stores the engine output in relation with the concentration ratio and the temperature of the supplied air under a supercharged state. The engine further includes an output setting means that sets the engine output by operating the two above-mentioned setting means based on the stored relationship to adjust the concentration ratio and the temperature of the supplied air.

The engine described in Japanese Laid-Open Patent Publication No. 2000-64863 performs internal EGR to increase the temperature of the premixed mixture and facilitate ignition. However, when the engine is idling, the thermal energy for heating the premixed mixture is insufficient when only internal EGR is employed. In such a case, homogeneous charge compression ignition becomes unstable.

The method described in Japanese Laid-Open Patent Publication No. 2000-240513 that re-circulates some of the exhaust gas to the intake passage and charges the exhaust gas into the premixed mixture to heat the premixed mixture, that is, the method that employs external EGR to increase the temperature of the premixed mixture has a low heating effect. This is because the high efficiency of homogeneous charge compression ignition results in a low exhaust temperature. Thus, the employment of exhaust gas recirculation (external EGR) slightly increases the temperature of the intake air. However, the specific heat of the air-fuel mixture is also increased. This may decrease the temperature at the compression end of the piston (top dead center), which affects ignition.

Another method described in Japanese Laid-Open Patent Publication No. 2000-240513 heats the premixed mixture with a heat exchanger using exhaust gas or hot water as a heat source. In this method, it may be difficult to heat the premixed mixture to a sufficient temperature due to the low exhaust gas temperature and the length of the passage extending through the heat exchanger. The publication describes a burner used for heating to obtain the hot water. When taking into consideration the fuel consumption of the burner, it is difficult to increase the energy efficiency of the entire apparatus even though homogeneous charge compression ignition ensures high combustion efficiency. Further, to heat the air-fuel mixture to a temperature that stabilizes homogeneous charge compression ignition just with the intake air, the intake air temperature must be increased to 120° C. or greater. Thus, when using hot water, measures, such as pressurizing the hot water, must be taken so that the hot water does not boil.

As described in Japanese Laid-Open Patent Publication No. 2001-221075, the homogeneous charge compression ignition engine includes a means for heating the air-fuel mixture with a supercharger that supplies supercharged air (intake air). This obtains the necessary heat when the engine is operating at a high speed. However, when the engine is operating at a low speed, the heating of the premixed mixture becomes insufficient. If another drive source, such as a motor, is used to drive the supercharger, the supercharger would be able to supercharge air. However, this would consume energy. Further, the employment of a supercharger would result in a complicated temperature adjustment means for the intake air. For example, a cooling means would become necessary.

SUMMARY OF THE INVENTION

It is an object of the present invention to provide a homogeneous charge compression ignition engine enabling homogeneous charge compression ignition to be performed in a wide range with a simple structure. Another object of the present invention is to provide a method for operating such an engine.

One aspect of the present invention is a homogeneous charge compression ignition engine for operation with a mixture of fuel and oxygen-containing gas. The engine includes a combustion chamber for supply with the mixture of fuel and oxygen-containing gas. A reciprocation piston compresses and ignites the mixture in the combustion chamber. An output shaft is rotated by reciprocation of the piston. An intake valve and an exhaust valve open and close the combustion chamber. A variable valve actuation mechanism opens and closes the intake valve or the exhaust valve to perform internal exhaust gas recirculation. A heater heats the oxygen-containing gas or mixture before the oxygen-containing gas or the mixture is supplied to the combustion chamber. A storage device stores correspondence information of an amount of internal exhaust gas recirculation and a heated state of the oxygen-containing gas or mixture heated by the heater that are necessary to perform homogeneous charge compression ignition in relation with the load of the engine and the rotation speed of the output shaft. A controller controls the variable valve actuation mechanism and the heater to achieve the amount of internal exhaust gas recirculation and the heated state of the oxygen-containing gas or mixture in correspondence with the load required for the engine and the rotation speed required for the output shaft.

Another aspect of the present invention is a method for operating a homogeneous charge compression ignition engine. The method includes supplying a combustion chamber with a mixture of fuel and oxygen-containing gas, compressing and igniting the mixture in the combustion chamber by reciprocating a piston, rotating an output shaft by reciprocating the piston, opening and closing the combustion chamber with an intake valve and an exhaust valve, driving a variable valve actuation mechanism to open and close the intake valve or exhaust valve in order to perform internal exhaust gas recirculation, storing correspondence information indicating an amount of internal exhaust gas recirculation and a heated state of the oxygen-containing gas or mixture that are necessary to perform homogeneous charge compression ignition in relation with the load of the engine and the rotation speed of the output shaft, determining from the correspondence information whether the load required for the engine and the rotation speed required for the output shaft are in a range enabling homogeneous charge compression ignition, and controlling the variable valve actuation mechanism based on the correspondence information to achieve the amount of internal exhaust gas recirculation and the heated state of the oxygen-containing gas or mixture in correspondence with the load required for the engine and the rotation speed required for the output shaft when the required load and the required rotation speed are in the range enabling homogeneous charge compression ignition, while heating the oxygen-containing gas or mixture before the oxygen-containing gas or the mixture is supplied to the combustion chamber.

A further aspect of the present invention is a method for operating a homogeneous charge compression ignition engine. The method includes supplying a combustion chamber with a mixture of fuel and oxygen-containing gas, compressing and igniting the mixture in the combustion chamber by reciprocating a piston, rotating an output shaft by reciprocating the piston, opening and closing the combustion chamber with an intake valve and an exhaust valve, driving a variable valve actuation mechanism to open and close the intake valve or exhaust valve in order to perform internal exhaust gas recirculation, storing a map showing an amount of internal exhaust gas recirculation and a heated state of the oxygen-containing gas or mixture that are necessary to perform homogeneous charge compression ignition in relation with the load of the engine and the rotation speed of the output shaft, controlling the variable valve actuation mechanism based on the map to achieve the amount of internal exhaust gas recirculation and the heated state of the oxygen-containing gas or mixture in correspondence with the load required for the engine and the rotation speed required for the output shaft, while heating the oxygen-containing gas or mixture before the oxygen-containing gas or the mixture is supplied to the combustion chamber, and performing spark ignition operation when the required load of the engine and the required rotation speed of the output shaft cannot be achieved by performing homogeneous charge compression ignition operation.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2(*b*) is a diagram showing in detail the portion encircled by the dotted line in FIG. 2(*a*);

FIGS. 8(b), 8(c), and 8(d) are diagrams showing portions of FIG. 8(a) in detail.

DETAILED DESCRIPTION OF THE PREFERRED EMBODIMENTS

Figure 1:
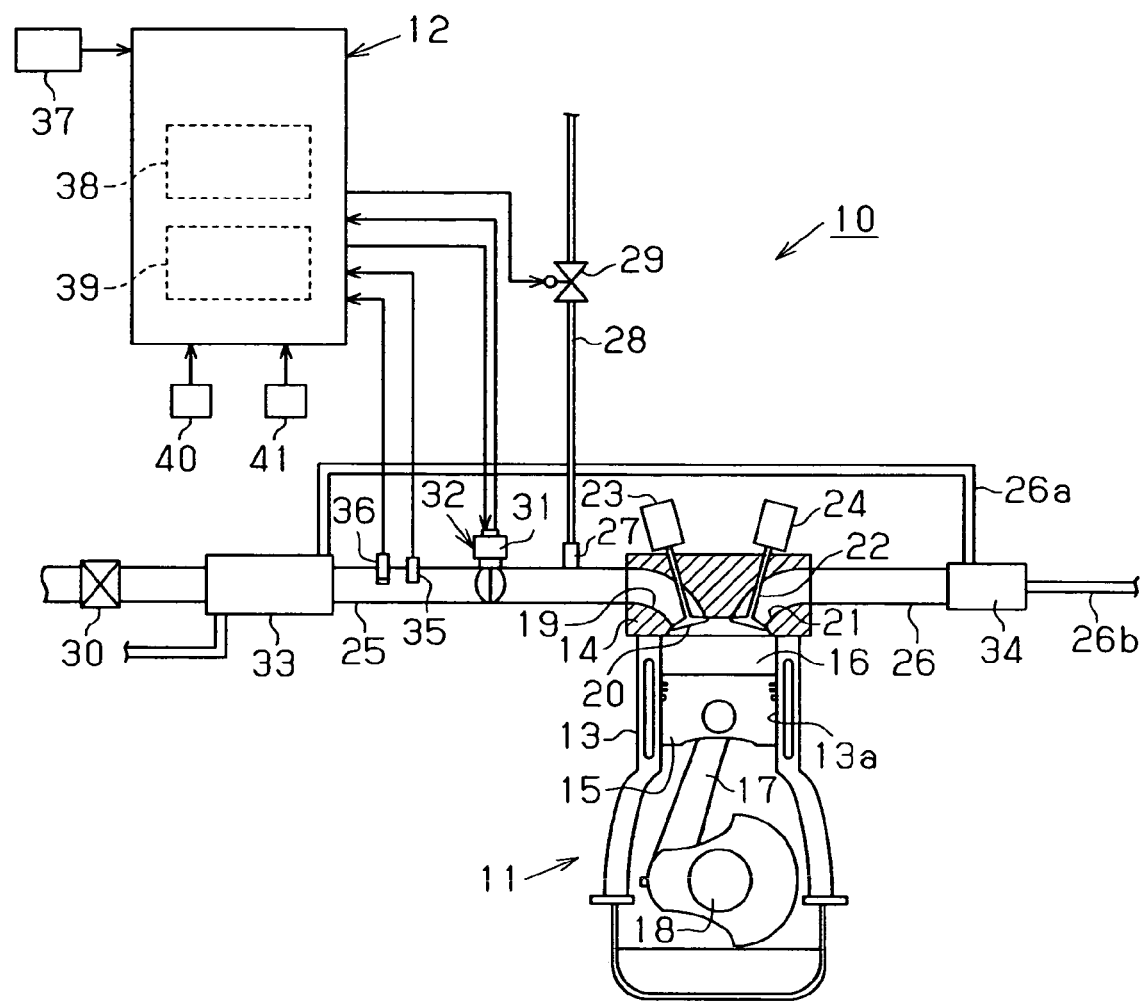
FIG. 1 is a schematic diagram showing a homogeneous charge compression ignition engine according to a first embodiment of the present invention.

A first embodiment of the present invention will now be described with reference to FIGS. 1 to 5. The homogeneous charge compression ignition engine 10 (hereafter simply referred to as an engine) includes an engine body 11 and a controller 12, which electronically controls the engine 10.

The engine body 11 includes a cylinder block 13, which houses a plurality of cylinders 13a (only one shown in FIG. 1), and a cylinder head 14. A piston 15 reciprocates in each cylinder 13a. A combustion chamber 16 is defined in each cylinder 13a between the piston 15 and the cylinder head 14. The piston 15 is propelled to reciprocate in the cylinder 13a by the force generated by the combustion of air-fuel mixture in the combustion chamber 16 after the intake and compression strokes. The reciprocation of the piston 15 is converted to rotation of a crankshaft 18, which functions as an output shaft, via a connection rod 17 to generate the output of the engine body 11. The engine body 11 is a four-cycle internal combustion engine.

For each cylinder 13a, an intake valve 20 for opening and closing an intake port 19 and an exhaust valve 22 for opening and closing an exhaust port 21 are arranged in the cylinder head 14. Variable valve actuation mechanisms 23 and 24 vary the opening and closing timing of the intake and exhaust valves 20 and 22, respectively. The intake and exhaust valves 20 and 22 are independently opened and closed by the variable valve actuation mechanisms 23 and 24. The variable valve actuation mechanisms 23 and 24 are formed by, for example, an electromagnetic driver or a hydraulic actuator.

An intake passage 25, which extends to the intake ports 19, and an exhaust passage 26, which extends from the exhaust ports 21, are connected to the cylinder head 14. A fuel injection nozzle 27 is arranged in the intake passage 25. The fuel injection nozzle 27 is connected to a fuel tank (not shown) by a pipe 28. An electromagnetic control valve 29 for controlling the supplied amount of fuel is arranged in the pipe 28. In this embodiment, natural gas is used as the fuel. Further, an air cleaner 30 and a throttle valve 31 are arranged in the intake passage 25 upstream from the fuel injection nozzle 27. The throttle valve 31 is electrically operated by a throttle motor 32 (electric motor). Adjustment of the open amount of the throttle valve 31 adjusts the flow rate of the intake air drawn into the combustion chambers 16.

A heater 33 for heating the intake air is arranged in the intake passage 25. In this embodiment, the heater 33 is formed by a heat exchanger that exchanges heat between the exhaust gas and the intake air. The exhaust passage 26 is branched into two passages. One branch passage 26a is connected to the heater 33. The exhaust gas flowing through the branch passage 26a exchanges heat with the intake air and is then released into the atmosphere. The exhaust gas flowing through the other branch passage 26b is directly released into the atmosphere. An electromagnetic three-way valve 34 is arranged in the branching portion of the exhaust passage 26 to adjust the percentage of the exhaust gas flowing through the branch passage 26a within a range of 0 to 100%. That is, the three-way valve 34 adjusts the amount of exhaust gas between a state in which all of the gas from the exhaust passage 26 flows to the branch passage 26b without passing through the branch passage 26a and the heater 33 and a state in which all of the exhaust gas flows to the branch passage 26b to be discharged into the atmosphere. The three-way valve 34 may be a spool valve.

A temperature sensor 35, which detects the temperature in the intake passage 25, and an airflow meter 36, which detects the flow rate of the intake air, are arranged in the intake passage 25 downstream from the heater 33 and upstream from the fuel injection nozzle 27.

The controller 12, which controls the operation of the engine 10, controls the variable valve actuation mechanisms 23 and 24, the electromagnetic control valve 29, the throttle motor 32, and the three-way valve 34 so as to satisfy the load and speed of the engine 10 set by an output setting means 37.

The controller 12 incorporates a microcomputer 38. The microcomputer 38 includes a memory 39 (ROM and RAM), which functions as a storage device. The temperature sensor 35, the airflow meter 36, a coolant temperature sensor 40 for detecting the coolant temperature in the engine body 11, and a speed sensor 41 for detecting the engine speed, or the rotation speed of the crankshaft 18, are each electrically connected to an input section (input interface) of the controller 12. The variable valve actuation mechanisms 23 and 24, the electromagnetic control valve 29, the throttle motor 32, and the three-way valve 34 are each electrically connected to an output section (output interface) of the controller 12.

Based on detection signals output from the sensors, the controller 12 determines the operation state of the engine 10 and controls the variable valve actuation mechanisms 23 and 24, the electromagnetic control valve 29, the throttle motor 32, and the three-way valve 34 to adjust the engine 10 to a predetermined operation state.

The memory 39 stores maps, formulas, etc. used to determine command values (control values) for controlling the engine 10 based on the operation state of the engine 10 that is determined from the detection signals of the temperature sensor 35, the airflow meter 36, the coolant temperature sensor 40, and the speed sensor 41. The maps and formulas include maps and formulas used to determine, for example, the fuel injection amount and the throttle open amount.

The memory 39 stores a homogeneous charge compression ignition operation map showing the amount of internal EGR and the heated state of the intake air heated by the heater 33 that enable homogeneous charge compression ignition in relation with the rotation speed and load of the crankshaft 18. Referring to FIG. 2(*a*), a homogeneous charge compression ignition operation map M, which functions as correspondence information, shows the range in which homogeneous charge compression ignition is enabled in relation with the load and speed of the crankshaft 18 (i.e., engine 10). As shown in FIG. 2(*a*), the range in which homogeneous charge compression ignition is possible includes a first area A1, in which combustion is stably performed by heating the air-fuel mixture only with internal EGR, and a second area A2, in which both heating of the air-fuel mixture with internal EGR and heating of the intake air with the heater 33 are performed. By performing both heating of the air-fuel mixture with internal EGR and heating of the intake air with the heater 33, the homogeneous charge compression ignitable range when the load and speed of the engine 10 are low and the homogeneous charge compression ignitable range when the load and speed of the engine 10 are high are enlarged in comparison to when heating is performed only with an internal EGR.

Based on the map M, the controller 12 controls the variable valve actuation mechanisms 23 and 24 and the heater 33 to achieve the internal EGR amount and heated state of the intake air that correspond to the required load and speed of the engine 10. There are gasoline engines and diesel engines that perform internal EGR. However, in such cases, the internal EGR rate is several percent to several tens of percent. In the present invention, internal EGR is performed so that the internal EGR rate is greater than several percent to several tens of percent. In this embodiment, internal EGR is performed so that the internal EGR rate is 30 to 80%. The internal EGR rate refers to the proportion of burned gas in the combustion chamber 16 relative to the total amount of gas in the combustion chamber 16.

The operation of the engine 10 will now be described.

The controller 12 determines the operation state of the engine body 11 from detection signals of the coolant temperature sensor 40, the speed sensor 41, etc. Further, the controller 12 calculates the target speed and load of the engine 10 to perform homogeneous charge compression ignition operation in a state that satisfies or is close to a state that satisfies required speed and load of the engine set by the output setting means 37. Further, the controller 12 controls the electromagnetic control valve 29, the throttle motor 32, the variable valve actuation mechanisms 23 and 24, and the three-way valve 34 to obtain a combustion state suitable for achieving the target speed and load, that is, to obtain the appropriate air-fuel ratio, internal EGR amount, and heated state of the intake air.

Figure 4:
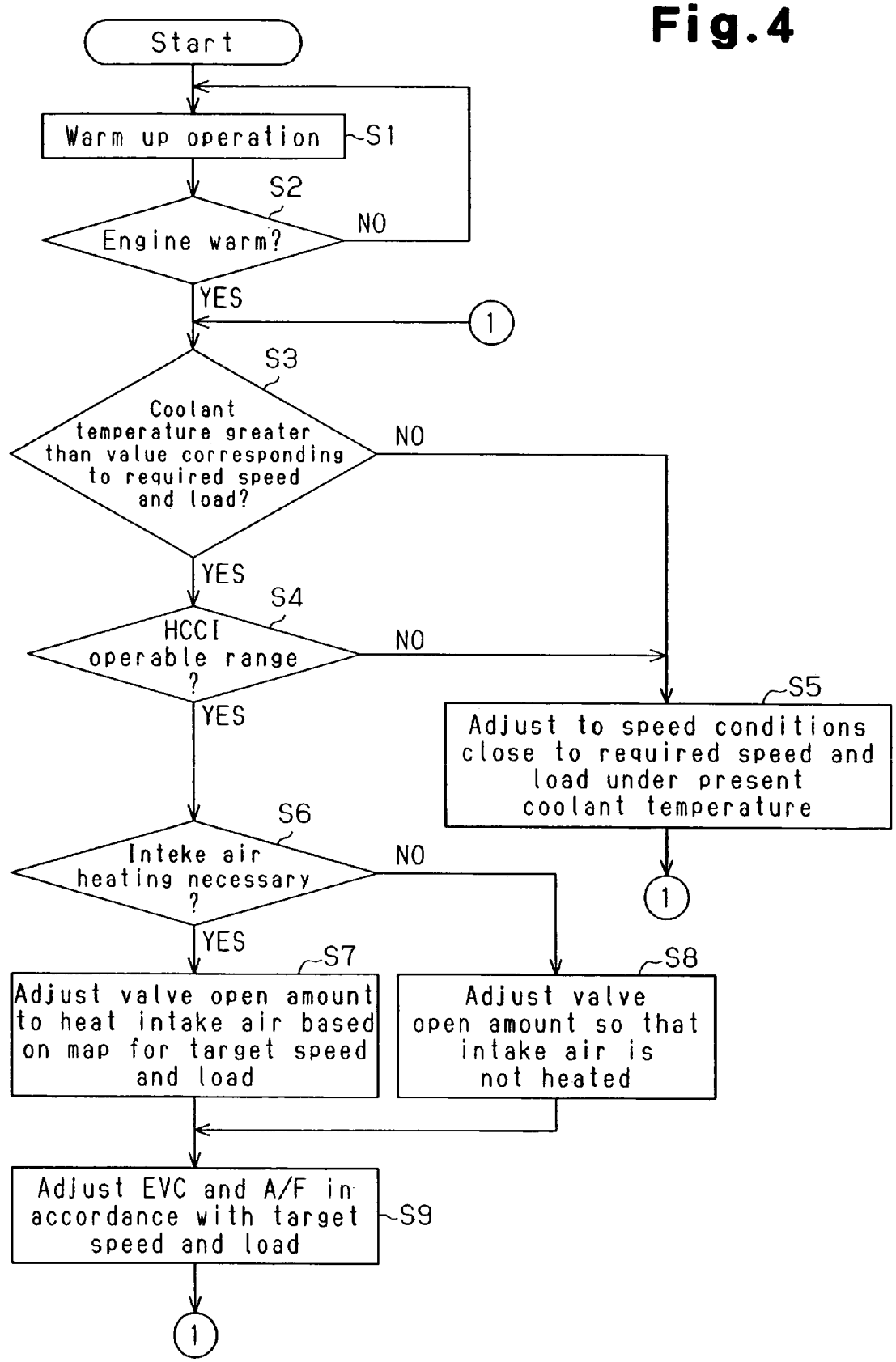
FIG. 4 is a flowchart showing operation control of the homogeneous charge compression ignition engine of FIG. 1.

The operation of the homogeneous charge compression ignition engine 10 is performed in accordance with the flowchart of FIG. 4. First, in step S1, the engine 10 undergoes a warm up operation. The controller 12 outputs command signals to the electromagnetic control valve 29 and the throttle motor 32 so as to achieve the air-fuel ratio that satisfies warm up operation conditions, which are stored in the memory 39. Further, the controller 12 outputs a command signal to the variable valve actuation mechanisms 23 and 24 to achieve the internal EGR amount that satisfies the warm up operation conditions.

Then, in step S2, the controller 12 determines whether or not the engine 10 has become warm based on the detection signal of the coolant temperature sensor 40. That is, the controller 12 determines whether the detection temperature of the coolant temperature sensor 40 is greater than or equal to a value indicating the engine 10 being warm. The controller 12 proceeds to step S3 if the warm up has been completed and returns to step S1 if the warm up has not been completed. The coolant temperature indicating that the engine 10 has been warmed is obtained beforehand through experiments and stored in the memory 39.

In step S3, the controller 12 determines whether or not the present coolant temperature is greater than a value (regulated value) corresponding to the required speed and load of the engine 10. The controller 12 proceeds to step S4 if the coolant temperature is greater than the regulated value and proceeds to step S5 if the coolant temperature is less than or equal to the regulated value. The regulated value is the temperature of the engine body 11 that enables stable homogeneous charge compression ignition (HCCI) operation in correspondence with the required speed and load by adjusting the conditions for performing heating with internal EGR and the heater 33. Further, the regulated value is obtained beforehand through experiments and stored in the memory 39.

In step S4, the controller S4 determines from the map M of FIG. 2(*a*) whether the required speed and load are included in a homogeneous charge compression ignition operable range. The controller 12 proceeds to step S6 if the required speed and load are included in the homogeneous charge compression ignition operable range and proceeds to step S5 if the required speed and load are excluded from the homogeneous charge compression ignition operable range. In step S5, the controller 12 sends command signals to the variable valve actuation mechanisms 23 and 24 and the three-way valve 34 to achieve operation conditions enabling homogeneous charge compression ignition near the required speed and load under the present coolant temperature. That is, under the present coolant temperature, the controller 12 sends command signals to the variable valve actuation mechanisms 23 and 24 to obtain the internal EGR amount corresponding to values close to the required speed and load. The controller 12 further sends a command signal to the three-way valve 34 to heat the intake air to a state corresponding to values close to the required speed and load.

In step S6, the controller 12 determines whether the intake air must be heated by the heater 33. The controller proceeds to step S7 if heating is necessary and proceeds to step S8 is heating is not necessary. In step S7, the controller 12 sends a command signal to the three-way valve 34 to supply the heater 33 with the amount of exhaust gas necessary to heat the intake air in accordance with the required speed and load. Then, the controller 12 proceeds to step S9. In step S8, the controller 12 sends a command signal to the three-way valve 34 so that the heater 33 does not heat the intake air. In other words, the controller 12 sends a command signal to the three-way valve 34 so that exhaust gas is not supplied to the heater 33. Then, the controller 12 proceeds to step S9.

In step S9, the controller 12 sends a command signal to the variable valve actuation mechanism 24 to achieve the required speed and load of the engine 10. In other words, the controller 12 sends a command signal to the variable valve actuation mechanism 24 to achieve the closing timing of the exhaust valve 22, or exhaust valve closing (EVC) timing, that is in accordance with the target speed and load. The controller 12 sends a command signal to the electromagnetic control valve 29 and the throttle motor 32 to achieve the air-fuel ratio (A/F) corresponding to the target speed and load. As a result, the engine 10 stably operates under the required speed and load.

Figure 2A:
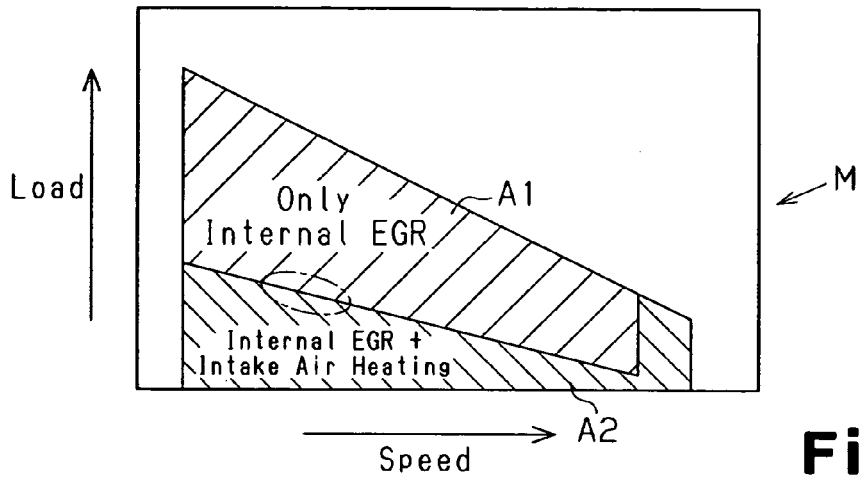
FIG. 2(*a*) is a map showing the range in which the engine of FIG. 1 is operable when performing homogeneous charge compression ignition in relationship with the speed and load of the engine.
Figure 2B:
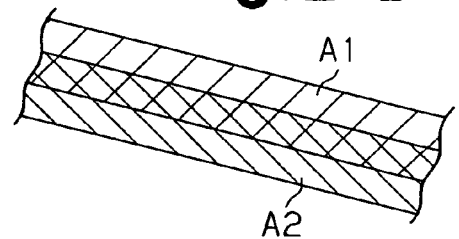

The map M, in more detail, is formed so that a band-shaped area (A1), which is indicative of the internal EGR amount in relation with the engine speed and load, and a band-shaped area (A2), which is indicative of the internal EGR amount and heating state in relation with the engine speed and load, partially overlap each other. With reference to FIG. 2(b), the map M is formed so that the band-shaped portion of the first area A1 and the band-shaped portion of the second area A2 overlap at the boundary between the first area A1 and the second area A2. Accordingly, when the operation conditions of the engine 10 shifts from the first area A1, in which the heater 33 is not used, to the second area A2, in which the heater 33 is used, the heater 33 is controlled to start heating in a state in which the engine 10 corresponds to the boundary portion A1 of the first area A1. This is preferable for smoothly heating the air-fuel mixture to a desired temperature.

In the present invention, when homogeneous charge compression ignition is performed, the air-fuel mixture is heated by internal EGR to facilitate ignition. The heater 33 is used when heating with only internal EGR is insufficient, such as during low load operation. This enlarges the operation range in which homogeneous charge compression ignition may be performed to the low load and high speed range. That is, when performing only internal EGR, the first area A1 shown in FIG. 2(a) corresponds to the range in which homogeneous charge compression ignition may be stably performed under the corresponding engine speed and load. When the heater 33 is used together with internal EGR, the range in which homogeneous charge compression ignition may stably be performed is enlarged to the second area A2.

When the ambient temperature is about 25° C., the temperature of the intake air when reaching the entrance of the engine body 11 becomes about 40° C. even when the heater 33 does not heat the intake air. It is preferred that the heater 33 heat the intake air so that its temperature is 80 to 90° C. at the entrance of the engine body 11.

Figure 3A:
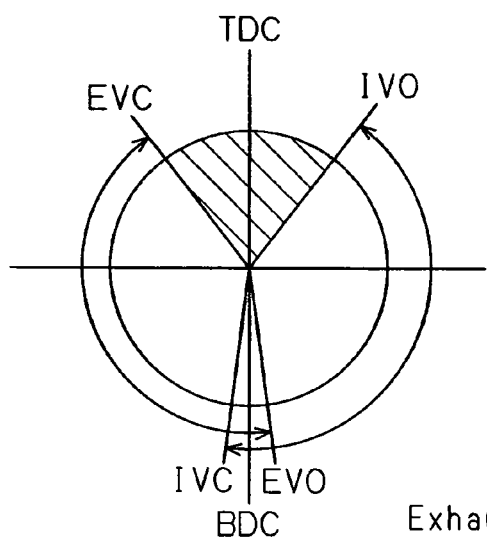
FIGS. 3(a) and 3(b) are diagrams showing the opening and closing timings of intake and exhaust valves in the engine of FIG. 1.
Figure 3B:
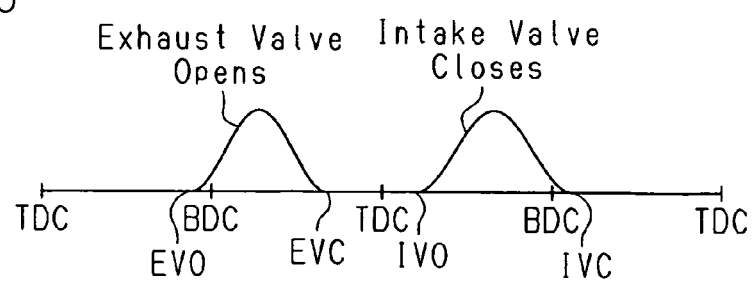

FIGS. 3(a) and 3(b) are diagrams showing an example of the valve timings of the variable valve actuation mechanisms 23 and 24. As shown in FIGS. 3(a) and 3(b), the intake valve 20 opens (IVO) when the piston 15 passes by the top dead center (TDC) and moves toward the bottom dead center (BDC). The intake valve 20 closes (IVC) when the piston 15 passes by the bottom dead center (BDC) and moves toward the top dead center (TDC). Further, the exhaust valve 22 opens (EVO) when the piston 15 approaches the bottom dead center (BDC) and closes (IVC) when the piston 15 passes by the bottom dead center (BDC) and moves toward the top dead center (TDC). That is, as shown in FIG. 3(b), there is no period in which the exhaust valve 22 in an open state overlaps with the intake valve 20 in an open state when the piston 15 shifts from the exhaust stroke to the intake stroke.

Figure 5A:
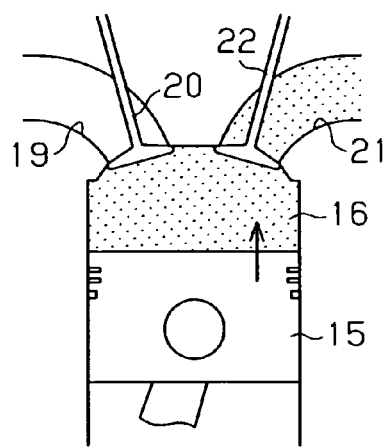
FIGS. 5(a) and 5(b) are schematic diagrams showing different stages of internal EGR performed by the engine of FIG. 1.
Figure 5B:
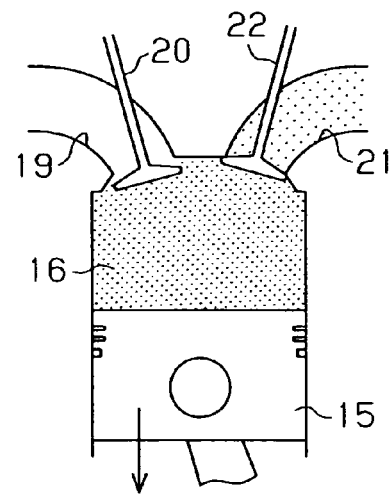

In this embodiment, the exhaust valve 22 closes the exhaust valve during the exhaust stroke, as shown in the state of FIG. 5(a) to enclose some of the burned gas in the combustion chamber 16. From the state of FIG. 5(a), the piston 15 is further lifted to compress and heat the burned gas. As the piston 15 passes by the top dead center and moves toward the bottom dead center, the intake valve is open, as shown in the state of FIG. 5(b), and fresh air-fuel mixture for the next cycle (mixture freshly supplied to the combustion chamber 16) is mixed with the heated burned gas. The closing timing of the exhaust valve 22 (EVC) is adjusted so that the internal EGR rate is in the range of 30 to 80%. The crank angle corresponding to the closing timing EVC of the exhaust valve 22 is, for example, 68 degrees to 92 degrees.

This embodiment has the advantages described below.

(1) The homogeneous charge compression ignition engine 10 includes the memory 39, which stores the homogeneous charge compression ignition operation map M showing the relation between the amount of internal EGR enabling homogeneous charge compression ignition and the state of the intake air heated by the heater 33. Based on the map M, the controller 12 controls the variable valve actuation mechanisms 23 and 24 and the heater 33 to achieve the internal EGR amount and heated state of the intake air corresponding to the required load and speed. Accordingly, the engine 10 enlarges the homogeneous charge compression ignition operation range with a simple structure. Further, the mixture is heated basically using the heat produced by internal EGR. This decreases the thermal energy required by the heater 33. Accordingly, sufficient controllability (being applicable to the required engine speed and load in a wide range) is ensured by using waste heat during homogeneous charge compression ignition.

(2) The opening and closing timing of the exhaust valve 22 (EVC) is controlled so that the internal EGR rate is in the range of 30 to 80%. Accordingly, heating of the mixture by internal EGR is effectively performed. This stabilizes homogeneous charge compression ignition.

(3) The heater 33 is a heat exchanger that exchanges heat between the exhaust gas and intake air. The heat generated by the operation of the engine 10 is effectively used for homogeneous charge compression ignition. Thus, even if the engine 10 is idling, homogeneous charge compression ignition is performed with satisfactory efficiency without having to supply thermal energy from an external device. This decreases energy consumption in comparison to when using other heaters. Further, even if the internal EGR amount is decreased for high load operations, waste heat compensates for lacking heat energy. Thus, highly efficient and stable homogeneous charge compression ignition is performed with a lean air-fuel mixture. This enables the operation range of the engine 10 to be enlarged without having to supply thermal energy from an external device.

(4) Internal EGR is performed by closing the exhaust valve 22 during the exhaust stroke and enclosing some of the burned gas in the combustion chamber 16. This facilitates the opening and timing control of the exhaust valve 22 in comparison to when temporarily opening and closing the exhaust valve 22 during the intake stroke to draw back the exhaust gas in the exhaust port 21 through the exhaust valve 22 and into the combustion chamber 16 in order to mix the exhaust gas with fresh air-fuel mixture.

(5) Based on the homogeneous charge compression ignition operation map M, the controller 12 determines whether the required load and speed are included in the homogeneous charge compression ignitable range. If the required load and speed are in the homogeneous charge compression ignitable range, based on the map M, the controller 12 controls the variable valve actuation mechanisms 23 and 24 and the heater 33 to achieve the internal EGR amount and heating state of the intake air or air-fuel mixture corresponding to the required load and speed. Accordingly, homogeneous charge compression ignition operation is performed in a stable state.

(6) The variable valve actuation mechanisms 23 and 24 are formed by electromagnetic drivers or hydraulic actuators. Accordingly, the closing timing of the exhaust valve 22 may be freely changed. This facilitates the control of the internal EGR rate. Further, when supplying the combustion chamber 16 with air-fuel mixture, adjustment of the opening timing of the intake valve 20 (IVO) facilitates the adjustment of the mixed state of the air-fuel mixture and the internal EGR gas.

(7) When the required load and speed are not included in the homogeneous charge compression ignitable range, the engine 10 is operated with an EGR amount and intake air heating state that correspond to a load and speed in the homogeneous charge compression ignitable range that is close to the required load and speed (step S5). Accordingly, when the required load and speed are not in the homogeneous charge compression ignitable range, the engine is operated in a state that is close to the range corresponding to the required load and speed.

Figure 6:
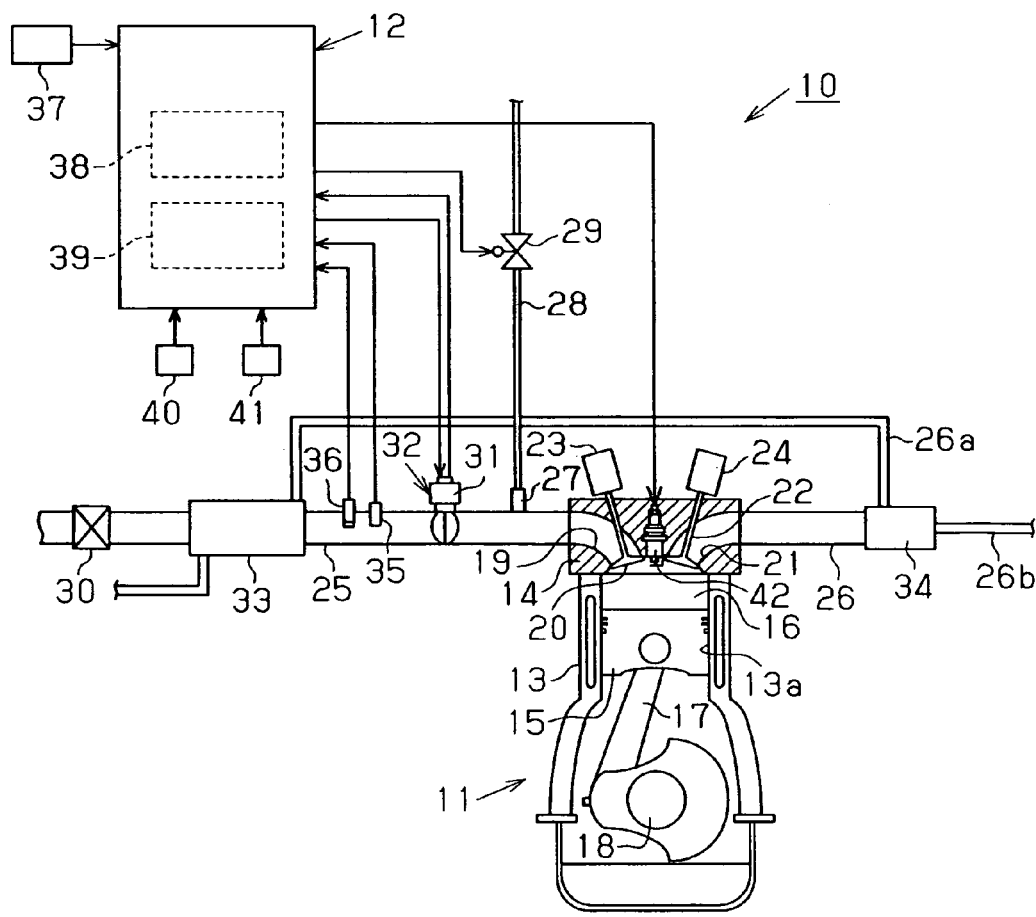
FIG. 6 is a schematic diagram showing a homogeneous charge compression ignition engine according to a second embodiment of the present invention.
Figure 7:
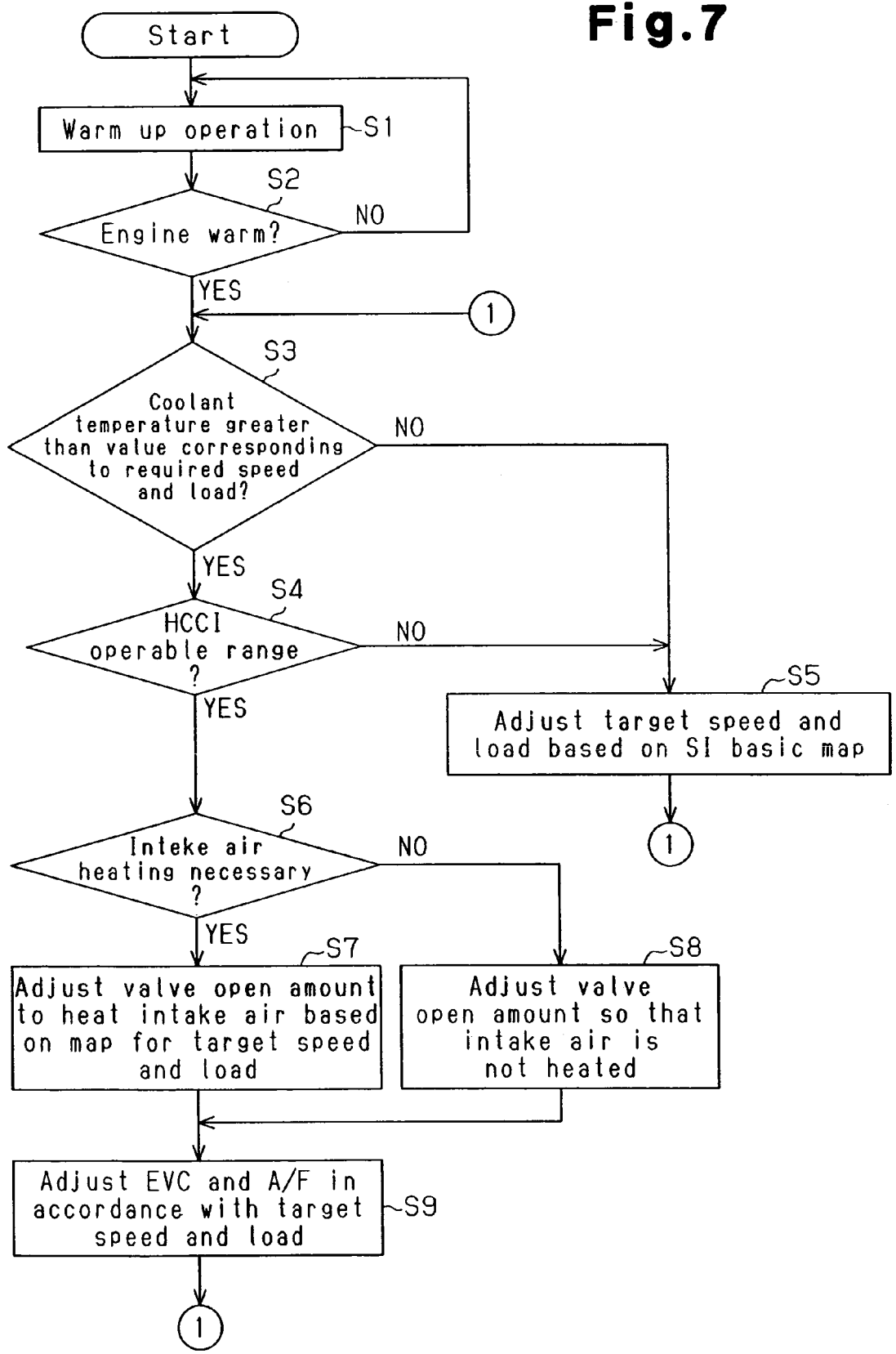
FIG. 7 is a flowchart showing operation control of the homogeneous charge compression ignition engine of FIG. 6.

A second embodiment will now be described with reference to FIGS. 6 and 7. The homogeneous charge compression ignition engine 10 of this embodiment differs greatly from the first embodiment in that it can perform both homogeneous charge compression ignition and spark ignition (SI). More specifically, the engine 10 of the second embodiment differs from that of the first embodiment in that it includes igniters. To avoid redundancy, like or same reference numerals are given to those components that are the same as the corresponding components of the first embodiment. Such components will not be described in detail. FIG. 6 is a schematic diagram showing the homogeneous charge compression ignition engine 10 of the second embodiment. FIG. 7 is a flowchart showing operation control of the homogeneous charge compression ignition engine 10.

Referring to FIG. 6, a spark plug 42, which functions as an igniter, is arranged on the cylinder head 14 for each combustion chamber 16. The spark plug 42 has an ignition portion exposed in the corresponding combustion chamber 16. In addition to the homogeneous charge compression ignition operation map M of FIG. 2($a$), the memory 39 stores a spark ignition operation map (not shown). When the required engine load and speed are not included in the homogeneous charge compression ignitable map M, the controller 12 performs the spark ignition operation. The controller 12 controls the operation of the homogeneous charge compression ignition engine 10 in accordance with the flowchart of FIG. 7.

The flowchart of FIG. 7 differs from the flowchart of the first embodiment only in that it includes step S10 in lieu of step S5. In the same manner as in the first embodiment, the warm up operation is performed in step S1. However, the warm up operation is performed by the spark ignition operation. Then, the controller 12 performs the homogeneous charge compression ignition operation when the required load and speed are in the homogeneous charge compression ignitable range and proceeds to step S10 when the required load and speed are not included in the homogeneous charge compression ignitable range. In step S10, based on the spark ignition operation map, the controller 12 controls the electromagnetic control valve 29 and the throttle motor 32 to achieve the air-fuel ratio and ignition timing corresponding to the target engine speed and load.

In addition to advantages (1) to (6), this embodiment has the advantages described below.

(8) The combustion chamber 16 includes the spark plug 42 to enable spark ignition. Accordingly, the engine 10 is applicable to a higher engine speed and load in comparison to the engine 10 of the first embodiment.

(9) In addition to the homogeneous charge compression ignition operation map M, the memory 39 includes a spark ignition operation map. Accordingly, when the required load and speed cannot be achieved through homogeneous charge compression ignition operation, the controller 12 may easily switch to spark ignition operation that achieves the required load and speed.

A third embodiment of the present invention will now be described. In this embodiment, the homogeneous charge compression ignition engine 10 differs greatly from the first and second embodiments in that homogeneous charge compression ignition is enabled even in a high load range, in which homogeneous charge compression ignition cannot be performed through only internal EGR. The hardware structure of the homogeneous charge compression ignition engine 10 is the same as that of the second embodiment shown in FIG. 6. Part of the program stored in the memory 39 differs from that of the second embodiment. To avoid redundancy, like or same reference numerals are given to those components that are the same as the corresponding components of the first and second embodiments. Such components will not be described in detail. FIG. 8($a$) is a map showing the relationship between the speed and load of the engine 10 in the homogeneous charge compression ignitable range. FIGS. 8($b$), 8($c$), 8($d$) show the portions encircled by broken lines in FIG. 8($a$).

The memory 39 stores a map M2 shown in FIG. 8($a$). The map M2 is a homogeneous charge compression ignition operation map showing the relationship between the EGR amount enabling homogeneous charge compression ignition and the heated state of the intake air. The homogeneous charge compression ignition operation map M2 shows the homogeneous charge compression ignitable range (A1, A2, and A3) in relation with the load and speed of the engine 10.

Referring to FIG. 8($a$), the homogeneous charge compression ignition range includes a first area A1, a second area A2, and a third area A3. In the first area A1, the mixture is heated by internal EGR to stabilize combustion. In the second area A2, the mixture is heated by internal EGR and the intake air is heated by the heater 33. In the third area A3, the mixture is heated by internal EGR and the intake air is heated by the heater 33. In other words, map M2 is formed by adding the third area A3 to the map M of FIG. 2($a$).

The second area A2 covers a low load range, in which combustion cannot be stabilized just by heating the mixture with internal EGR, and a high speed range, in which combustion cannot be stabilized just by heating the mixture with internal EGR. The third area A3 covers a high load range, in which combustion cannot be stabilized just by heating the mixture with internal EGR, and a high load, high speed range, in which combustion cannot be stabilized just by heating the mixture with internal EGR. In the map M2, the boundary portion between the first area A1 and the third area A3 (FIG. 8($c$)) and the boundary portion between the second area A2 and the third area A3 (FIG. 8($d$)) are formed in the same manner as the boundary portion between the first area A1 and the second area A2 (FIG. 8($b$)). More specifically, in FIG. 8($c$), the band-shaped area (A1) showing the internal EGR amount and heating state in relation to the speed and load partially overlaps the band-shaped area (A3) showing the internal EGR amount and heating state in relation to the speed and load. In FIG. 8($d$), the two band-shaped areas (A2 and A3), which show the internal EGR amount and heating state in relation to the speed and load, partially overlap each other.

The second area A2 and the third area A3 are the same in that they both require heating of the mixture with the internal EGR and heating of the intake air with the heater 33. However, heating is mainly performed by internal EGR in the second area A2, while heating is mainly performed by the heater 33 in the third area A3. This is because the amount of fuel supplied in correspondence with the required load in the low load range (A2) is small. Thus, there would be no problem if the intake air is decreased and the internal EGR amount is increased. However, the amount of fuel supplied in correspondence with the required load in the high load range (A3) is large. Thus, when the internal EGR rate is increased combustion may become unstable and misfires may occur due to a lack in the amount of intake air, or oxygen. In this embodiment, the internal EGR rate is 80% at the boundary between the first area A1 and the second area A2 (FIG. 8(b)), and the internal EGR rate is 30% at the boundary between the first area A1 and the third area A3 (FIG. 8(c)).

In the third area A3, the internal EGR rate is set to 30% or less. That is, the closing timing of the exhaust valve 22 (EVC) is adjusted so that the internal EGR rate is 30% or less. The valve closing timing corresponds to, for example, the crank angle being 68 degrees or less, which is prior to the top dead center. In the third area A3, the internal EGR amount becomes substantially null depending on the operation conditions. When the internal EGR amount becomes close to null, that is, when most of the heating is performed by the heater 33, the temperature of the intake air becomes 120° C. Accordingly, in the third area A3, the temperature of the intake air subsequent to heating is 80 to 120° C.

When operating the homogeneous charge compression ignition engine 10, the controller 12 gives priority to homogeneous charge compression ignition operation. However, when the required engine load and speed are not included in the homogeneous charge compression ignitable range of the map M2, the controller 12 performs spark ignition operation. The controller 12 controls the operation of the homogeneous charge compression ignition engine 10 in accordance with a flowchart similar to the flowchart of FIG. 7. In the flowchart of the third embodiment, the contents of steps S6 and S7 differ from that of FIG. 7.

In step S6, the controller 12 determines whether or not heating with the heater 33 is necessary. The controller 12 makes this determination based on which area of the map M2 the required speed and load is located in. When the required speed and load are located in the second area A2 or the third area A3, the controller 12 proceeds to step S7. In step S7, to supply the heater with the amount of exhaust gas required to achieve the heating state that is in correspondence with the location of the required speed and load in the second area A2 or third area A3, the controller 12 determines the open amount of the three-way valve 34 based on the map and sends a command signal to the three-way valve 34. When the required load is a high load in which homogeneous charge compression ignition cannot be stably performed only with internal EGR, the controller 12 adjusts the internal EGR amount and the open amount of the three-way valve 34 based on the third area A3 of the map M2. When the required load is a low load in which homogeneous charge compression ignition cannot be stably performed only with the internal EGR, the controller 12 adjusts the internal EGR amount and the open amount of the three-way valve 34 based on the second area A2 of the map M2.

When the operation state is shifted from the first area A1, which does not use the heater 33, to the third area A3, which uses the heater 33, it is preferred that the heating of the intake air with the heater 33 be started in a state corresponding to the boundary portion of the first area A1 to smoothly heat the intake temperature to the desired temperature. When the operation state is shifted from the second area A2 to the third area A3, it is preferred that the amount of intake air heated with the heater 33 be increased in a state corresponding to the boundary portion of the second area A2. When the operation state is shifted from the third area A3 to the second area A2, it is preferred that the amount of intake air heated with the heater 33 be decreased in a state corresponding to the boundary portion of the third area A3.

In addition to advantages (1) to (6) of the first embodiment and advantages (8) and (9) of the second embodiment, this embodiment has the advantages described below.

(10) By causing the internal EGR rate to be 30% or less, the internal EGR amount may be decreased to increase the amount of supplied intake air in correspondence with a high load. Further, the lack of the heated amount of intake air resulting from the decrease of the internal EGR amount is compensated for by increasing the amount of intake air heated by the heater 33 and raising the temperature of the intake air. Accordingly, the homogeneous charge compression ignitable range may be enlarged to the high load range in which homogeneous charge compression ignition cannot be performed in the first and second embodiments.

(11) When operating the engine 10 with a high load, the temperature of the exhaust gas is higher compared to when operating the engine 10 with a low load. The waste heat generated when the engine 10 is operating under a high load may be used by the heater. This compensates for the thermal energy that becomes insufficient when the internal EGR is decreased and enables highly efficient homogeneous charge compression ignition with a lean air-fuel mixture.

It should be apparent to those skilled in the art that the present invention may be embodied in many other specific forms without departing from the spirit or scope of the invention. Particularly, it should be understood that the present invention may be embodied in the following forms.

Depending on the environment the homogeneous charge compression ignition engine 10 is used, instead of the low load range, there may be cases in which the range enabling stable homogeneous charge compression ignition must be enlarged to the high load range. In such a case, using the structure of the third embodiment, map M3 shown in FIG. 9 may be used in lieu of the map M2 of FIG. 8(a) as a map showing the relationship between the internal EGR amount enabling homogeneous charge compression ignition and the state of the intake air heated by the heater 33. In the map M3, the homogeneous charge compression ignitable range includes a first area A1, in which combustion is stabilized by performing only heating of the mixture with internal EGR, and a third area A3, in which heating of the mixture with internal EGR and heating of the intake air with the heater must both be performed.

Figure 8A:
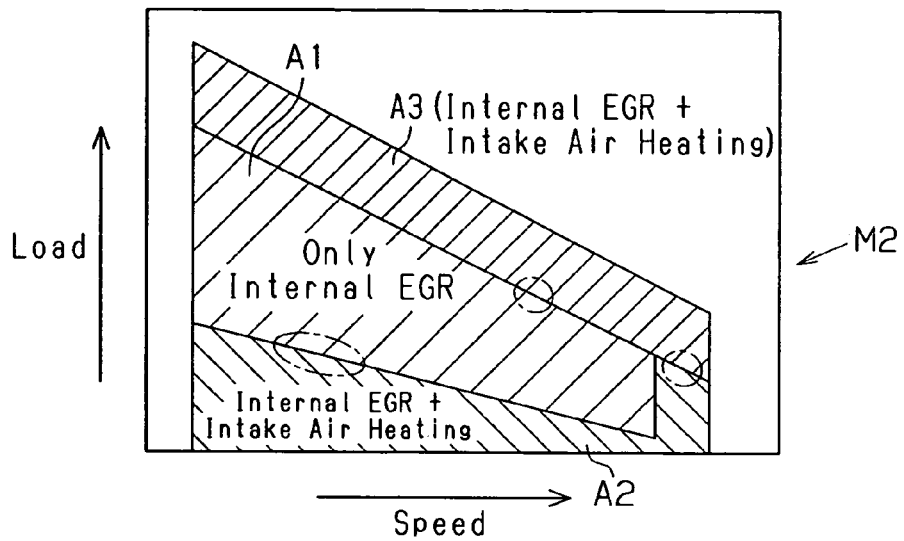
FIG. 8(a) is a map showing the range in which an engine according to a third embodiment of the present invention is operable when performing homogeneous charge compression ignition in relationship with the speed and load of the engine.
Figure 8A:
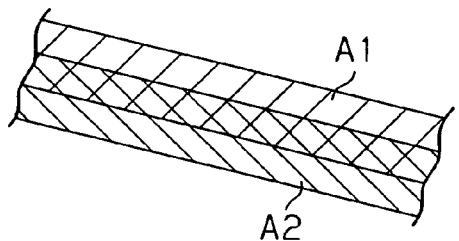
Figure 8A:
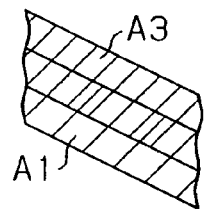
Figure 8A:
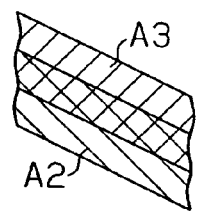
Figure 9:
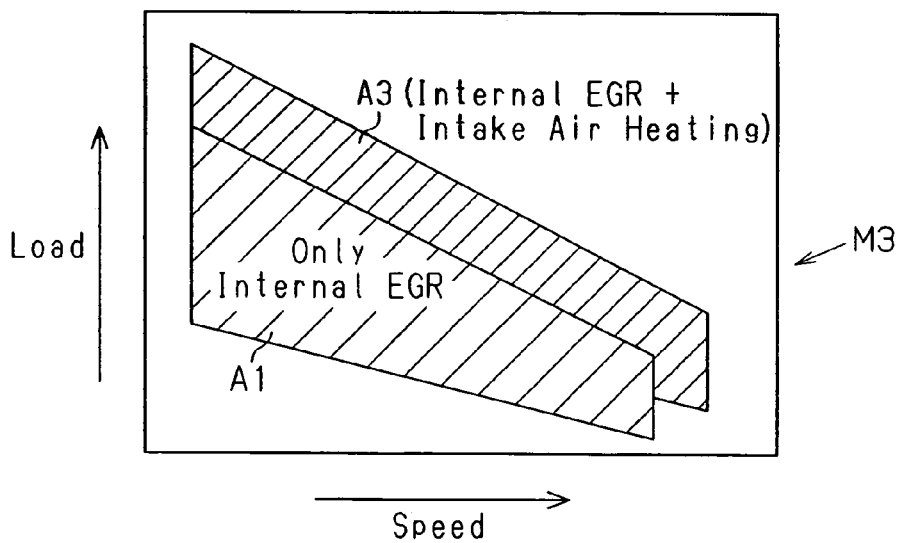
FIG. 9 is a map showing the range in which an engine according to a further embodiment of the present invention is operable when performing homogeneous charge compression ignition in relationship with the speed and load of the engine.

In the third embodiment (FIG. 8(a)) and the embodiment of FIG. 9, the structure enabling homogeneous charge compression ignition in the high load range (A3), in which homogeneous charge compression ignition cannot be performed only with internal EGR, may be employed for the homogeneous charge compression ignition engine 10 of FIG. 1 that does not have an igniter (spark plug 42) and performs only homogeneous charge compression ignition.

In the third area A3 of the map M2 and map M3, the temperature of the air-fuel mixture may be adjusted to a value enabling stable homogeneous charge compression ignition even if the internal EGR rate is 0%, that is, even if internal EGR is not performed and only heating of the intake air is performed with the heater 33.

Internal EGR may be performed by opening the exhaust valve 22 during the intake stroke to draw back some of the exhaust gas from the exhaust port 21 to the combustion chamber 16. Further, an exhaust gas guide passage, which is connected to the combustion chamber 16 and the exhaust port 21, and a valve, which closes and opens the exhaust gas guide passage, may be employed. In other words, the valve may be controlled to draw back some of the exhaust gas from the exhaust port 21 to the combustion chamber 16 during the intake stroke and mix the exhaust gas with fresh air-fuel mixture.

The heater 33 is not limited to a heat exchanger that uses exhaust has a heat source and exchanges heat with intake air. The heater 33 may be a heat exchanger that uses the coolant of the engine body 11 as a heat source and exchanges heat with the intake air. However, the temperature of the exhaust gas is higher than the coolant. Thus, a heat exchanger using exhaust gas as a heat source has a higher intake air heating efficiency. Further, a heat exchanger using exhaust gas as a heat source to perform heat exchange and a heat exchanger using the coolant of the engine body 11 to perform heat exchange may both be employed.

Instead of heating the intake air, the heater 33 may heat the mixture of intake air and fuel. Alternatively, the intake air and the mixture may both be heated.

Instead of a heat exchanger that uses exhaust gas or the coolant of the engine body 11 as a heat source to perform heat exchange, the heater 33 may be may be an electric heater that heats the intake air or air-fuel mixture. Alternatively, the heater 33 may additionally include such an electric heater. During warm up operation, the temperatures of the exhaust gas and coolant are low. Thus, when using the exhaust gas or coolant as a heat source, the intake air or air-fuel mixture may not be sufficiently heated. However, the employment of an electric heater enables heating of the intake air or air-fuel mixture to the necessary temperature within a short period of time and stabilizes the warm up operation. Further, the electric heater is effective when the intake air or air-fuel mixture must be heated within a short period of time after warm up operation.

In the homogeneous charge compression ignition operation map M showing the amount of internal EGR and state of the intake air heated by the heater 33 that enable homogeneous charge compression ignition in relation with the engine load and speed, instead of directly showing load, other values corresponding to load, such as indicated mean effective pressure (IMEP), or the operation amount of a setting means for setting the required load may be employed.

In the maps M2 and M3, instead of directly showing the load, other values corresponding to load, such as indicated mean effective pressure (IMEP), or an operation amount of a setting means for setting the required load may be employed.

The fuel of the homogeneous charge compression ignition engine 10 is not limited to natural gas and may be any type of fuel, such as gasoline, propane gas, methanol, dimethylether, hydrogen, and diesel fuel.

Fuel that is easily compressed and ignited during only the warm up operation may be used. In this case, after the warm up operation, the fuel is switched to normal operation fuel.

The homogeneous charge compression ignition engine 10 is not limited to a four-cycle engine and may be a two-cycle engine.

The fuel of the air-fuel mixture does not have to be a gas and may be atomized fuel.

Fuel does not have to be injected into the intake passage 25 and mixed with intake air to produce an air-fuel mixture drawn into the combustion chamber 16. For example, fuel may be injected into the combustion chamber 16 during the intake stroke. Further, the fuel may be mixed with intake air in a carburetor or mixer.

The homogeneous charge compression ignition engine 10 does not have to have a plurality of cylinders and may have only one cylinder.

The variable valve actuation mechanism 23 and 24 may each be a known mechanism that uses a camshaft to open and close an intake valve or exhaust valve by means of a cam or locker arm.

Instead of a three-way valve 34 arranged at a branching portion of the branch passages 26a and 26b to adjust the amount of exhaust gas flowing to the branch passage 26a from the exhaust passage 26, a flow adjustment valve may be arranged in each of the branch passages 26a and 26b. In this case, the controller 12 controls the two flow adjustment valves.

The homogeneous charge compression ignition engine 10 does not have to be stationary and may be used as an automobile engine. In such a case, the engine 10 must be switchable between homogeneous charge compression ignition operation and spark ignition operation.

The intake air does not have to be air and may be a gas containing oxygen, which is necessary to burn the fuel. For example, a gas produced by mixing oxygen in air to increase the oxygen concentration may be used.

The present examples and embodiments are to be considered as illustrative and not restrictive, and the invention is not to be limited to the details given herein, but may be modified within the scope and equivalence of the appended claims.

What is claimed is:

1. A homogeneous charge compression ignition engine for operation with a mixture of fuel and oxygen-containing gas, the engine comprising:
    a combustion chamber for supply with the mixture of fuel and oxygen-containing gas;
    a reciprocation piston for compressing and igniting the mixture in the combustion chamber;
    an output shaft rotated by reciprocation of the piston;
    an intake valve and an exhaust valve for opening and closing the combustion chamber;
    a variable valve actuation mechanism for opening and closing the intake valve or the exhaust valve to perform internal exhaust gas recirculation;
    a heater for heating the oxygen-containing gas or mixture before the oxygen-containing gas or the mixture is supplied to the combustion chamber;
    a storage device for storing correspondence information of an amount of internal exhaust gas recirculation and a heated state of the oxygen-containing gas or mixture heated by the heater that are necessary to perform homogeneous charge compression ignition in relation with the load of the engine and the rotation speed of the output shaft; and
    a controller for controlling the variable valve actuation mechanism and the heater to achieve the amount of internal exhaust gas recirculation and the heated state of the oxygen-containing gas or mixture in correspondence with the load required for the engine and the rotation speed required for the output shaft.

2. The engine according to claim 1, wherein the controller controls the variable valve actuation mechanism to close the exhaust valve when the piston is in an exhaust stroke or open the exhaust valve when the piston is in an intake stroke to perform internal exhaust gas recirculation.

3. The engine according to claim 1, wherein opening and closing timings of the exhaust valve are controlled so that an internal exhaust gas recirculation rate is in the range of 30 to 80%.

4. The engine according to claim 3, wherein the internal exhaust gas recirculation rate refers to the proportion of burned gas in the combustion chamber relative to the total amount of gas in the combustion chamber.

5. The engine according to claim 1, wherein the burned gas drawn back into the combustion chamber or enclosed in the combustion chamber by internal exhaust gas recirculation heats the oxygen-containing gas or the mixture, and the controller activates the heater when the engine is incapable of stably performing homogeneous charge compression ignition by heating the oxygen-containing gas or the mixture only with the internal exhaust gas recirculation.

6. The engine according to claim 5, wherein the controller activates the heater when the load of the engine is low.

7. The engine according to claim 1, wherein the burned gas drawn back into the combustion chamber or enclosed in the combustion chamber by internal exhaust gas recirculation heats the oxygen-containing gas or the mixture, and the controller activates the heater if the load of the engine is high and the engine is incapable of stably performing homogeneous charge compression ignition by heating the oxygen-containing gas or the mixture only with the internal exhaust gas recirculation.

8. The engine according to claim 7, wherein the controller controls the opening and closing timings of the exhaust valve so that the internal gas rate becomes 30% or less.

9. The engine according to claim 1, wherein the heater includes a heat exchanger for exchanging heat between exhaust gas or engine coolant and the oxygen-containing gas or mixture.

10. The engine according to claim 9, wherein the heater further includes an electric heater for heating the oxygen-containing gas or the mixture, and the controller heats the oxygen-containing gas or mixture by using the electric heater at least when the engine is being warmed.

11. The engine according to claim 1, wherein the combustion chamber includes an igniter, and the controller controls the igniter so that the engine performs spark ignition if the load required for the engine and the load rotation speed required for the output shaft cannot be achieved when the engine performs homogeneous charge compression ignition.

12. The engine according to claim 1, wherein the correspondence information comprises a map that includes:
an area showing the internal exhaust gas recirculation amount in relation with the load of the engine and the rotation speed of the output shaft; and
an area showing the internal exhaust gas recirculation amount and the heated state of the oxygen-containing gas or mixture heated by the heater in relation with the load of the engine and the rotation speed of the output shaft, wherein the two areas partially overlap with each other.

13. A method for operating a homogeneous charge compression ignition engine, the method comprising:
supplying a combustion chamber with a mixture of fuel and oxygen-containing gas;
compressing and igniting the mixture in the combustion chamber by reciprocating a piston;
rotating an output shaft by reciprocating the piston;
opening and closing the combustion chamber with an intake valve and an exhaust valve;
driving a variable valve actuation mechanism to open and close the intake valve or exhaust valve in order to perform internal exhaust gas recirculation;
storing correspondence information indicating an amount of internal exhaust gas recirculation and a heated state of the oxygen-containing gas or mixture that are necessary to perform homogeneous charge compression ignition in relation with the load of the engine and the rotation speed of the output shaft;
determining from the correspondence information whether the load required for the engine and the rotation speed required for the output shaft are in a range enabling homogeneous charge compression ignition; and
controlling the variable valve actuation mechanism based on the correspondence information to achieve the amount of internal exhaust gas recirculation and the heated state of the oxygen-containing gas or mixture in correspondence with the load required for the engine and the rotation speed required for the output shaft when the required load and the required rotation speed are in the range enabling homogeneous charge compression ignition, while heating the oxygen-containing gas or mixture before the oxygen-containing gas or the mixture is supplied to the combustion chamber.

14. A method for operating a homogeneous charge compression ignition engine, the method comprising:
supplying a combustion chamber with a mixture of fuel and oxygen-containing gas;
compressing and igniting the mixture in the combustion chamber by reciprocating a piston;
rotating an output shaft by reciprocating the piston;
opening and closing the combustion chamber with an intake valve and an exhaust valve;
driving a variable valve actuation mechanism to open and close the intake valve or exhaust valve in order to perform internal exhaust gas recirculation;
storing a map showing an amount of internal exhaust gas recirculation and a heated state of the oxygen-containing gas or mixture that are necessary to perform homogeneous charge compression ignition in relation with the load of the engine and the rotation speed of the output shaft;
controlling the variable valve actuation mechanism based on the map to achieve the amount of internal exhaust gas recirculation and the heated state of the oxygen-containing gas or mixture in correspondence with the load required for the engine and the rotation speed required for the output shaft, while heating the oxygen-containing gas or mixture before the oxygen-containing gas or the mixture is supplied to the combustion chamber; and
performing spark ignition operation when the required load of the engine and the required rotation speed of the output shaft cannot be achieved by performing homogeneous charge compression ignition operation.

15. The method according to claim 14 further comprising:
performing spark ignition with the engine until the engine is warmed; and
performing homogeneous charge compression ignition operation with the engine after the spark ignition operation when the required load of the engine and the required rotation speed of the output shaft are in a range in which homogeneous charge compression ignition is enabled.

* * * * *

UNITED STATES PATENT AND TRADEMARK OFFICE
CERTIFICATE OF CORRECTION

| | |
|---|---|
| PATENT NO. | : 6,983,730 B2 |
| APPLICATION NO. | : 11/101334 |
| DATED | : January 10, 2006 |
| INVENTOR(S) | : Hiroshi Kuzuyama |

Page 1 of 1

It is certified that error appears in the above-identified patent and that said Letters Patent is hereby corrected as shown below:

In the Specification

Column 8, line 41, please delete "to step S8 is" and insert therefore -- to step S8 if --

Signed and Sealed this

Thirty-first Day of October, 2006

JON W. DUDAS
*Director of the United States Patent and Trademark Office*